United States Patent
Amano et al.

(10) Patent No.: US 11,485,811 B2
(45) Date of Patent: Nov. 1, 2022

(54) PARTICLES CONTAINING MODIFIED POLYVINYL ALCOHOL

(71) Applicant: KURARAY CO., LTD., Kurashiki (JP)

(72) Inventors: Yusuke Amano, Kurashiki (JP); Yuki Tachibana, Kurashiki (JP); Yuki Shimizu, Kurashiki (JP); Kazuhiko Maekawa, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 130 days.

(21) Appl. No.: 16/961,408

(22) PCT Filed: Feb. 18, 2019

(86) PCT No.: PCT/JP2019/005878
§ 371 (c)(1),
(2) Date: Jul. 10, 2020

(87) PCT Pub. No.: WO2019/160142
PCT Pub. Date: Aug. 22, 2019

(65) Prior Publication Data
US 2020/0362078 A1    Nov. 19, 2020

(30) Foreign Application Priority Data
Feb. 19, 2018 (JP) .............................. JP2018-027263

(51) Int. Cl.
C08F 216/06    (2006.01)

(52) U.S. Cl.
CPC ........ *C08F 216/06* (2013.01); *C08F 2500/24* (2013.01); *C08F 2800/10* (2013.01)

(58) Field of Classification Search
CPC .. C08F 8/32; C08F 20/14; C08F 20/18; C08F 12/22; C08K 5/17; C08K 5/43; C08G 73/0233; B01J 31/0251
See application file for complete search history.

(56) References Cited

U.S. PATENT DOCUMENTS

| | | | |
|---|---|---|---|
| 4,960,673 A * | 10/1990 | Beck | ........................ G03F 7/11 430/908 |
| 6,081,312 A | 6/2000 | Aminaka et al. | |
| 2009/0111940 A1 | 4/2009 | Kato et al. | |
| 2009/0247698 A1 | 10/2009 | Nitta | |
| 2010/0041828 A1 | 2/2010 | Kato et al. | |
| 2010/0143720 A1 | 6/2010 | Asanuma et al. | |
| 2019/0330396 A1 | 10/2019 | Fukuhara | |
| 2019/0345279 A1 | 11/2019 | Amano et al. | |

FOREIGN PATENT DOCUMENTS

| | | |
|---|---|---|
| EP | 3 666 803 A1 | 6/2020 |
| JP | 48-61 95 | 2/1973 |
| JP | 4-283749 A | 10/1992 |
| JP | 10-31 21 66 A | 11/1998 |
| JP | 2001-72720 A | 3/2001 |
| JP | 2007-63383 A | 3/2007 |
| WO | WO 2007/023762 A1 | 3/2007 |
| WO | WO 2007/119735 A1 | 10/2007 |
| WO | WO 2008/129936 A1 | 10/2008 |
| WO | WO 2008/143286 A1 | 11/2008 |
| WO | WO 2018/124014 A1 | 7/2018 |
| WO | WO 2018/124015 A1 | 7/2018 |
| WO | WO 2018/124242 A1 | 7/2018 |
| WO | WO 2019/031461 A1 | 2/2019 |

OTHER PUBLICATIONS

International Search Report dated Apr. 23, 2019 in PCT/JP2019/005878 filed Feb. 18, 2019, 2 pages.

\* cited by examiner

*Primary Examiner* — Robert D Harlan
(74) *Attorney, Agent, or Firm* — Oblon, McClelland, Maier & Neustadt, L.L.P.

(57) ABSTRACT

The invention relates to particles with an average particle size of 300 to 1000 μm, comprising a modified polyvinyl alcohol having vinyl alcohol units and structural units represented by formula (1), wherein a content of the vinyl alcohol units is 60 to 90 mol % based on the total structural units:

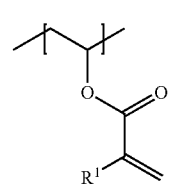

(1)

wherein $R^1$ represents a hydrogen atom or a methyl group. Thus, the present invention provides particles containing a modified polyvinyl alcohol having high water solubility and high affinity for a photosensitive monomer, which are highly photosensitive.

20 Claims, No Drawings

PARTICLES CONTAINING MODIFIED POLYVINYL ALCOHOL

TECHNICAL FIELD

The present invention relates to particles containing a modified polyvinyl alcohol which are highly photosensitive.

BACKGROUND ART

Since polyvinyl alcohol resins are rare crystalline water-soluble polymers having excellent interface and strength properties, they have been utilized for paper processing, for fiber processing and as a stabilizer for emulsion. Meanwhile, attempts have been made for higher functions including improvement in a particular performance by controlling crystallinity and introducing a functional group, and a variety of so-called modified polyvinyl alcohols have been developed.

An olefin, which is a reactive functional group, can be introduced into a side chain of a vinyl alcohol-based polymer to allow for making the polymer water-resistant by high-energy beam crosslinking, modifying the polymer by graft polymerization, and so on. In particular, a modified polyvinyl alcohol having an α,β-unsaturated structure in a side chain can be conveniently made water-resistant by high-energy beam crosslinking and can be developed with water. It has been, therefore, extensively used in an original plate for an aqueous printing plate and the like in view of recent tightening of environmental regulations.

There have been proposed several modified polyvinyl alcohols having an α,β-unsaturated structure in a side chain. Examples include modified polyvinyl alcohols having an acrylate or methacrylate group (Patent Reference Nos. 1 and 2), and having an acrylamide group (Patent Reference No. 3) in a side chain. However, these modified polyvinyl alcohols have a bulky side chain, which is disadvantageous because plenty of modifications are required for increasing the amount of photosensitive moieties per a unit weight of a modified polyvinyl alcohol and a multistage reaction process is required for introducing an α,β-unsaturated structure.

To solve such a problem, for example, Patent Reference No. 4 has exemplified a method for introducing the above methacrylate group into a polyvinyl alcohol resin in a one-step reaction. A modified polyvinyl alcohol provided by the method described in Patent Reference No. 4 has an unbulky unit structure in a side chain having a methacrylate group, and thus a less amount of modification can increase the amount of photosensitive moieties per a unit weight of a modified polyvinyl alcohol.

PRIOR ART REFERENCES

Patent References

Patent Reference No. 1: JP 1998-312166A
Patent Reference No. 2: JP 1992-283749A
Patent Reference No. 3: JP 2001-72720A
Patent Reference No. 4: WO 2007/23762

SUMMARY OF THE INVENTION

Problems to be Solved by the Invention

The inventors have found a problem that particularly when a content of vinyl alcohol units is low, a modified polyvinyl alcohol described in Patent Reference No. 4 has a strong tendency to gelate during dissolution depending on the shape of the resin, leading to reduction of water solubility. To solve the problem, an objective of the present invention is to provide particles containing a modified polyvinyl alcohol having high water solubility and high affinity for a photosensitive monomer, which are highly photosensitive.

Means for Solving the Problems

The inventors have supposed that heat applied to a resin during dissolution causes a reaction between photosensitive moieties to self-crosslink a modified polyvinyl alcohol, resulting in gelation, and after making intense attempts, have found that particles having a particular range of an average particle size which contain a particular modified polyvinyl alcohol can solve the above problem.

According to the present invention, the above problems can be solved by providing the followings.

[1] Particles with an average particle size of 300 to 1000 μm, comprising a modified polyvinyl alcohol having vinyl alcohol units and structural units represented by formula (1), wherein a content of the vinyl alcohol units is 60 to 90 mol % based on the total structural units:

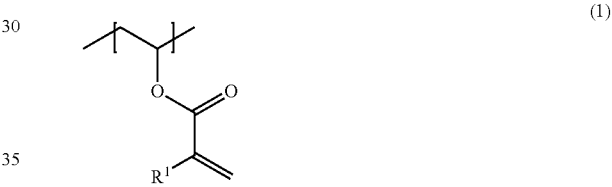

wherein $R^1$ represents a hydrogen atom or a methyl group.

[2] The particles according to [1], wherein a specific surface area is 0.01 to 0.5 m²/g.

[3] The particles according to [1] or [2], wherein a block character of residual vinyl ester groups in the modified polyvinyl alcohol is 0.35 to 0.60.

[4] The particles according to any of [1] to [3], wherein a content of the structural units represented by formula (1) is 0.05 to 3.0 mol % based on the total structural units in the modified polyvinyl alcohol.

Effects of the Invention

The particles of the present invention have high water solubility and high affinity for a photosensitive monomer, and are highly photosensitive.

MODES FOR CARRYING OUT THE INVENTION

Particles of the present invention contain a modified polyvinyl alcohol (hereinafter, sometimes referred to as "modified polyvinyl alcohol (A)") having vinyl alcohol units and structural units represented by formula (1) (hereinafter, sometimes referred to as "structural unit (1)"), wherein a content of the vinyl alcohol units is 60 to 90 mol % based on the total structural units:

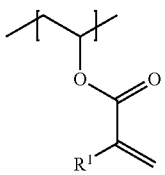

(1)

wherein $R^1$ represents a hydrogen atom or a methyl group.

The olefin present in the structural unit (1) can be crosslinked by a high-energy beam, so that a modified polyvinyl alcohol (A) allows for improving water resistance and gel formation by crosslinking. Furthermore, the olefin is an α,β-unsaturated type which is so reactive to be easily crosslinked by high-energy beam.

In Formula (1), $R^1$ represents a hydrogen atom or a methyl group. In the light of storage stability, $R^1$ is preferably a methyl group.

A content of the structural unit (1) in the modified polyvinyl alcohol (A) is, but not limited to, preferably 0.05 mol % or more, more preferably 0.07 mol % or more, particularly preferably 0.1 mol % or more, and preferably 3 mol % or less, more preferably 2.5 mol % or less, based on the total structural units in the modified polyvinyl alcohol (A). When a content of the structural unit (1) is the lower limit or more, crosslinking by high-energy beam is promoted. When a content of the structural unit (1) is the upper limit or less, reduction of water solubility due to self-crosslinking between the structural units (1) can be easily inhibited. The modified polyvinyl alcohol (A) can contain one or more types of the structural units (1). When it contains 2 or more types of the structural units (1), the total content of the two or more types of the structural unit (1) is preferably within the above range. "Structural unit" as used herein means a repeating unit constituting a polymer. Examples of a structural unit include a vinyl alcohol unit described below and a vinyl ester unit described later.

In the modified polyvinyl alcohol (A), a content of the vinyl alcohol units based on the total structural units is 60 to 90 mol %. If a content of the vinyl alcohol units is less than 60 mol %, water solubility of the modified polyvinyl alcohol is deteriorated. Meanwhile, if a content of the vinyl alcohol units is more than 90 mol %, a particle surface is swollen during preparation of an aqueous solution so that particles are mutually fused to form coarse aggregates (so-called "lumps") and thus dissolution of the lumps requires prolonged dissolution treatment at an elevated temperature, inducing gelation by thermal crosslinking. If a content of the vinyl alcohol units is more than 90 mol %, affinity for a photosensitive monomer is lowered. A content of the vinyl alcohol units is preferably 65 mol % or more, more preferably 68 mol % or more, further preferably 72 mol % or more, and preferably 88 mol % or less, more preferably 86 mol % or less. When a content of the vinyl alcohol units is within these preferable ranges, a modified polyvinyl alcohol (A) is moderately water-soluble and a particle surface is swelling-resistant, so that particles of the present invention tend to have excellent water solubility. The particles tend to have higher surface activity, and is, therefore, suitable for the use as a dispersant. Furthermore, they tend to have improved affinity for a photosensitive monomer, and can be, therefore, applied to a photosensitive resin layer used for a printing material or the like.

A vinyl alcohol unit can be derived from a vinyl ester unit by hydrolysis or alcoholysis. Thus, depending on the conditions of conversion of a vinyl ester unit to a vinyl alcohol unit, vinyl ester units may remain in a modified polyvinyl alcohol (A). Therefore, a modified polyvinyl alcohol (A) may contain vinyl ester units other than the structural units represented by Formula (1).

Examples of a vinyl ester for the above vinyl ester unit include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate and vinyl benzoate. Among these, vinyl acetate is preferable in the light of industrial applications.

As long as the present invention has an effect, a modified polyvinyl alcohol (A) can further contain structural units other than the structural units (1), vinyl alcohol units and vinyl ester units. The structural unit is, for example, a structural unit which is copolymerizable with a vinyl ester and is derived from an unsaturated monomer convertible to a structural unit (1) or an ethylenic unsaturated monomer copolymerizable with a vinyl ester. Examples of an ethylenic unsaturated monomer include α-olefins such as ethylene, propylene, n-butene, isobutylene and 1-hexene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid and salts thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide, N-methylacrylamide, N-ethylacrylamide, N,N-dimethylacrylamide, diacetone acrylamide, acrylamidepropanesulfonic acid and salts thereof, acrylamidepropyldimethylamine and salts thereof (for example, quaternary salts); methacrylamide, N-methylmethacrylamide, N-ethylmethacrylamide, methacrylamidepropanesulfonic acid and salts thereof, methacrylamidepropyldimethylamine and salts thereof (for example, quaternary salts); vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether and 2,3-diacetoxy-1-vinyloxypropane; vinyl cyanides such as acrylonitrile and methacrylonitrile; vinyl halides such as vinyl chloride and vinyl fluoride; vinylidene halides such as vinylidene chloride and vinylidene fluoride; allyl compounds such as allyl acetate, 2,3-diacetoxy-1-allyloxypropane and allyl chloride; unsaturated dicarboxylic acids and salts thereof or esters thereof such as maleic acid, itaconic acid and fumaric acid; vinylsilyl compounds such as vinyltrimethoxysilane; and isopropenyl acetate.

There are no particular restrictions to a sequence of a structural unit (1), a vinyl alcohol unit, and other optional structural units in a modified polyvinyl alcohol (A), and a modified polyvinyl alcohol (A) can be any of a random copolymer, a block copolymer and an alternate copolymer.

A viscosity-average polymerization degree of a modified polyvinyl alcohol (A) as measured in accordance with JIS K6726 is, but not limited to, preferably 100 or more, more preferably 200 or more, further preferably 300 or more and preferably 3,000 or less, more preferably 2,500 or less, further preferably 2,000 or less. When the viscosity-average polymerization degree is the above lower limit or more, a film produced tends to have excellent mechanical strength. When the viscosity-average polymerization degree is the above upper limit or less, water solubility is so high that prolonged treatment at an elevated temperature during preparing an aqueous solution is not necessary, and gelation by thermal crosslinking is inhibited.

A block character (hereinafter, sometimes referred to as "η'") of residual vinyl ester groups in a modified polyvinyl alcohol (A) is preferably 0.35 or more, more preferably 0.37 or more, further preferably 0.40 or more and preferably 0.60 or less, more preferably 0.57 or less, further preferably 0.55 or less. "A block character of residual vinyl ester groups" is an indicator of sequence distribution status of residual vinyl ester units, which is determined by analyzing three peaks observed in a methylene region in $^{13}$C-NMR spectrum. In the spectrum, the three peaks correspond to three 2-unit sequences (dyad), that is, (OH,OH), (OH,OAc), (OAc,OAc) from the left, respectively, and intensities are proportional to their structures. η' can take a value of 0 to 2. η'=0 means complete block. As η' approaches 2, alternativity increases. η'=1 means that vinyl alcohol units and vinyl ester units are completely randomly present (see, "Poval", Kobunshi-Kankokai, revised edition, Apr. 1, 1981, pp. 246 to 249). When η' is the above lower limit or more, crystallinity of a modified polyvinyl alcohol (A) is moderately lowered and water solubility of particles is moderately increased, so that prolonged treatment at an elevated temperature during preparing an aqueous solution is not necessary, and gelation by thermal crosslinking is inhibited. When η' is the above upper limit or less, crystallinity of a modified polyvinyl alcohol (A) is moderately increased and water solubility of the modified polyvinyl alcohol (A) is moderately lowered while water solubility of a particle surface is moderately lowered, so that when particles of the present invention are added into hot water, formation of lumps can be easily inhibited. Therefore, prolonged treatment at an elevated temperature for dissolving lumps during preparing an aqueous solution is not necessary, and gelation by thermal crosslinking is inhibited.

Particles of the present invention have an average particle size of 300 to 1000 μm. As described above, a modified polyvinyl alcohol having structural units represented by Formula (1) has a problem that due to its higher reactivity, it easily gelates during dissolving it in water. However, it has been found that when an average particle size is within the above range, a dissolution rate of the particles in water is so high that a solution can be prepared by a brief dissolution process and thus an aqueous solution can be consistently prepared without causing crosslinking of structural units represented by Formula (1). If the average particle size is less than 300 μm, lumps are easily formed during adding particles containing a modified polyvinyl alcohol to hot water. Thus, a prolonged treatment at an elevated temperature is required for dissolving lumps during preparation of an aqueous solution, inducing gelation by thermal crosslinking. The average particle size is preferably 400 μm or more, more preferably 500 μm or more. If the average particle size is more than 1000 μm, water solubility of the particles is lowered, so that a prolonged treatment at an elevated temperature is required during preparation of an aqueous solution, inducing gelation by thermal crosslinking. The average particle size is preferably 900 μm or less, more preferably 800 μm or less. An average particle size as used herein denotes a volume average particle size as determined for a dispersion of a modified polyvinyl alcohol in methanol by means of a light scattering method using a laser beam.

A specific surface area of particles of the present invention is, but not limited to, preferably 0.01 m$^2$/g or more, more preferably 0.03 m$^2$/g or more, further preferably 0.05 m$^2$/g or more, and preferably 0.5 m$^2$/g or less, more preferably 0.3 m$^2$/g or less, further preferably 0.2 m$^2$/g or less. When a specific surface area is the above lower limit or more, water solubility of the particles is moderately increased, so that a prolonged treatment at an elevated temperature is not necessary during preparation of an aqueous solution and gelation by thermal crosslinking is inhibited. When a specific surface area is the above upper limit or less, a density of particles of the present invention is moderately increased, so that when the particles are added to hot water, the particles tend to settle out in the hot water and thus formation of lumps on the water surface is inhibited, thereby a prolonged treatment at an elevated temperature for dissolving lumps during preparation of an aqueous solution is not necessary and gelation by thermal crosslinking is inhibited.

A content of a modified polyvinyl alcohol (A) in particles of the present invention is, but not limited to, for example 50% by mass or more, more preferably 70% by mass or more, further preferably 90% by mass or more, particularly preferably 95% by mass or more, possibly 100% by mass.

A modified polyvinyl alcohol (A) can be produced by, but not limited to, transesterification of a polyvinyl alcohol with an acrylic or methacrylic acid ester; reaction of a polyvinyl alcohol with acrylic or methacrylic anhydride; or reaction of a polyvinyl alcohol with acryloyl or methacryloyl chloride.

When a modified polyvinyl alcohol (A) is produced by transesterification of a polyvinyl alcohol with an acrylic or methacrylic acid ester, a preferable embodiment is that a polyvinyl alcohol, an acrylic or methacrylic acid ester represented by Formula (2) (hereinafter, sometimes referred to as ester (2)), and a transesterification catalyst are mixed to initiate transesterification of a vinyl alcohol unit in the polyvinyl alcohol with the ester (2). Examples of a saturated hydrocarbon group having 1 to 5 carbon atoms represented by R$^2$ include a methyl group, an ethyl group, a n-propyl group, an isopropyl group, a n-butyl group and a t-butyl group. An alcohol represented by R$^2$OH (R$^2$ is as defined in Formula (2)) is eliminated by transesterification, and the reaction of the polyvinyl alcohol with the ester (2) is promoted by removing the alcohol to the outside of the reaction system. From this perspective, the alcohol is preferably a low-boiling compound; R$^2$ has preferably 1 to 3 carbon atoms, more preferably 1 carbon atom, that is, R$^2$ is preferably a methyl group.

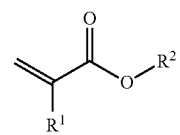

(2)

wherein, R$^1$ is a hydrogen atom or a methyl group; and R$^2$ represents a saturated hydrocarbon group having 1 to 5 carbon atoms.

When a modified polyvinyl alcohol (A) is produced by transesterification of a polyvinyl alcohol with an ester (2), a transesterification catalyst can coexist. Examples of a transesterification catalyst include, but not limited to, inorganic acids such as hydrochloric acid, sulfuric acid, nitric acid and phophoric acid; organic carboxylic acids such as acetic acid, propionic acid, phthalic acid and benzoic acid; organic sulfonic acids such as methanesulfonic acid, benzenesulfonic acid, p-toluenesulfonic acid and trifluoromethanesulfonic acid; organic phosphoric acids such as diethyl phosphate and phenyl phosphate; alkali metal or alkaline earth metal hydroxides such as sodium hydroxide, potassium hydroxide and magnesium hydroxide; alkali metal or alkaline earth metal carbonates such as sodium hydrogen carbonate, potassium carbonate and calcium hydrogen carbonate; alkali metal or alkaline earth metal phosphates and hydrogen phosphates such as trilithium phosphate, potassium dihydrogen phosphate, sodium pyrophosphate and calcium metaphosphate; alkali metal or alkaline earth metal borates such as potassium metaborate, sodium tetraborate and magnesium orthoborate; alkali metal or alkaline earth metal carboxylates such as sodium acetate, potassium acetate, sodium benzoate and magnesium acetate; alkali metal or alkaline earth metal alkoxide or phenoxy compounds such as lithium ethoxide, sodium methoxide, potassium methoxide, magnesium methoxide and sodium phenoxide; alkali metal or alkaline earth metal oxides such as calcium oxide; ammonia; ammonium salts such as ammonium hydroxide, tetramethylammonium hydroxide, tetraethylammonium hydroxide, tetrabutylammonium hydroxide, ammonium carbonate, ammonium hydrogen carbonate, tetramethylammonium methyl carbonate, tetramethylammonium ethyl carbonate, methyltriethylammonium methyl carbonate, methyltri-n-butylammonium methyl carbonate, and methyltri-n-octylammonium methyl carbonate; phosphonium salts such as tetraphenylphosphonium hydroxide, tetramethylphosphonium hydroxide, tetramethylphosphonium methyl carbonate, methyltri-n-butylphosphonium ethyl carbonate and methyltri-n-octylphosphonium methyl carbonate; primary amines such as n-butylamine, benzylamine, aniline and ethylenediamine; secondary amines such as diethylamine, methylethylamine, pyrrolidine, N-methyltoluidine; tertiary amines such as triethylamine, tri-n-butylamine, N-methyl-N-ethylaniline, 1,4-diazabicyclo[2.2.2]octane and 1,8-diazabicyclo[5.4.0]-7-undecene; nitrogen-containing aromatic heterocyclic compounds such as pyridine, picoline, quinoline, imidazole, pyrimidine and N,N-dimethylaminopyridine; cadmium compounds such as cadmium chloride, cadmium oxide and cadmium acetate; tin compounds such as tin chloride, tin oxide, tin acetate, tin octanoate, tributyltin and tin(IV) acetylacetonate dichloride; lead compounds such as lead chloride, lead oxide, lead carbonate and lead tetraacetate; aluminum compounds such as aluminum chloride, aluminum oxide, aluminum acetate and aluminum alkoxides; zinc compounds such as zinc chloride, zinc bromide, zinc iodide, zinc oxide, zinc acetate, zinc trifluoroacetate, zinc stearate, zinc nitrate, zinc carbonate, zinc sulfate, zinc(II) acetylacetonate, zinc(II) trifluoromethanesulfonate, zinc 2-tetrafluoroborate and oxo[hexa(trifluoroacetato)]tetrazinc; bismuth compounds such as bismuth chloride, bismuth oxide and bismuth acetate; iron compounds such as iron chloride, iron oxide, iron acetate, ferric(III) acetylacetonate and N,N'-bis(salicylidene)ethyleneamine iron(II); cobalt compounds such as cobalt chloride, cobalt oxide, cobalt acetate, cobalt stearate and cobalt(II) acetylacetonate; copper compounds such as copper chloride, copper bromide, copper iodide, copper oxide, copper acetate and copper(II) acetylacetonate; chromium compounds such as chromium chloride, chromium oxide, chromium acetate and chromium (III) acetylacetonate; molybdenum compounds such as molybdenum chloride, molybdenum oxide, molybdenum acetate and acetylacetone molybdenum(VI) dioxy salt; manganese compounds such as manganese chloride, manganese oxide, manganese acetate, manganese(II) acetylacetonate; titanium compounds such as titanium chloride, titanium oxide, titanium acetate, alkoxy titanium, titanium lactate, titanium(VI)oxide acetylacetonate; zirconium compounds such as zirconium chloride, zirconium oxide, zirconium acetate and zirconium(IV) acetylacetonate; hafnium compounds such as hafnium chloride, hafnium oxide and hafnium (IV) trifluoromethanesulfonate; lanthanum compounds such as lanthanum chloride, lanthanum oxide, lanthanum acetate, lanthanum nitrate, lanthanum alkoxides, lanthanum(III) acetylacetonate and lanthanum(III) trifluoromethanesulfonate; germanium compounds such as germanium chloride and germanium oxide; and enzymes such as lipase. Among these, more preferred are inorganic acids, organic carboxylic acids, organic sulfonic acids, organic phosphoric acids, alkali metal or alkaline earth metal hydroxides, alkali metal or alkaline earth metal carbonates and hydrogen carbonates, alkali metal or alkaline earth metal phosphates and hydrogen phosphates, alkali metal or alkaline earth metal carboxylates, alkali metal or alkaline earth metal alkoxides or phenoxides, ammonium salts, phosphonium salts, aluminum compounds, zinc compounds, bismuth compounds, titanium compounds, zirconium compounds and lanthanum compounds, in the light of reactivity and hue of a modified polyvinyl alcohol (A) obtained. Further preferred are inorganic acids, organic carboxylic acids, organic sulfonic acids, alkali metal or alkaline earth metal hydroxides, alkali metal or alkaline earth metal carbonates and hydrogen carbonates, alkali metal or alkaline earth metal carboxylic acids, alkali metal or alkaline earth metal alkoxides, ammonium salts, zinc compounds, titanium compounds, zirconium compounds and lanthanum compounds. Most preferred are alkali metal or alkaline earth metal carbonates, ammonium salts and zinc compounds.

The amount of a transesterification catalyst is, but not limited to, preferably 0.01 parts by mass or more, more preferably 0.1 parts by mass or more, and preferably 30 parts by mass or less, more preferably 15 parts by mass or less, based on 100 parts by mass of a polyvinyl alcohol. When the amount of a transesterification catalyst is the above lower limit or more, a reaction rate tends to be high, and when the amount is the above upper limit or less, a residual catalyst can be easily removed and hue and thermal stability of a modified polyvinyl alcohol (A) obtained tend to be excellent. The amount of the ester (2) is, but not limited to, preferably 0.1 parts by mass or more, more preferably 5 parts by mass or more, and preferably 1000 parts by mass or less, more preferably 500 parts by mass or less, based on 100 parts by mass of a polyvinyl alcohol. When the amount of the ester (2) is the above lower limit or more, a reaction rate tends to be excellent, and when the amount is the above upper limit or less, the residual ester (2) after the reaction can be easily removed.

A modified polyvinyl alcohol (A) can be produced by transesterification of a polyvinyl alcohol with an ester (2) by means of any reaction method as long as it goes through a state of mixing a polyvinyl alcohol, an ester (2) and a transesterification catalyst; for example, mixing a molten polyvinyl alcohol with an ester (2) and a transesterification catalyst to initiate the reaction; reacting these, in a slurry state, in a solvent in which the ester (2) and the transesterification catalyst are soluble and the polyvinyl alcohol is insoluble; and reacting these in a solution in which all of the polyvinyl alcohol, the ester (2) and the transesterification catalyst are homogeneously dissolved. Among these methods, a suitable method can be appropriately employed, taking into account reactivity, isolation of a modified polyvinyl alcohol (A) and the like. In the light of achieving a block character of the residual vinyl ester groups in the modified polyvinyl alcohol (A) within the above suitable range, preferred is a method of reacting the reactants in a slurry in a solvent in which the ester (2) and the transesterification catalyst are soluble and the polyvinyl alcohol is insoluble. A reaction temperature in the transesterification is, but not limited to, desirably a boiling point of the alcohol eliminated from the ester (2) or higher, in the light of removing the alcohol to the outside of the reaction system. From this view, the temperature is preferably 20 to 200° C., more preferably 30 to 180° C., further preferably 40 to 170° C., most preferably 50 to 150° C. The reaction system can be under reduced pressure in order to lower a boiling point of the alcohol eliminated from the ester (2), wherein a pressure of the system is preferably 5 kPa to 99 kPa, more preferably 8 kPa to 97 kPa, further preferably 10 kPa to 95 kPa.

When a modified polyvinyl alcohol (A) is produced by transesterification of a polyvinyl alcohol with an ester (2), a solvent to be used can be selected from, but not limited to, the group consisting of water; alcohols such as methanol, ethanol, propanol and butanol; aliphatic or alicyclic hydrocarbons such as n-hexane, n-pentane and cyclohexane; aromatic hydrocarbons such as benzene and toluene; aliphatic or aromatic halides such as chloroform, chlorobenzene and dichlorobenzene; nitriles such as acetonitrile and benzonitrile; ethers such as diethyl ether, diphenyl ether, anisole, 1,2-dimethoxyethane and 1,4-dioxane; ketones such as acetone, methyl isopropyl ketone and methyl isobutyl ketone; esters such as ethyl acetate and ethyl propionate; N-alkyllactams such as N-methyl-2-pyrrolidone; N, N-dialkylamides such as N,N-dimethylformamide and N, N-dimethylacetamide; sulfoxides such as dimethyl sulfoxide; and sulfolanes such as sulfolane. Among these, aprotic polar solvents are preferable, including nitriles, ethers, ketones, esters, N-alkyllactams, N,N-dialkylamides, sulfoxides and sulfolanes. N-alkyllactams, N,N-dialkylamides and sulfoxides are more preferable.

Particles of the present invention can be prepared by, but not limited to, a procedure that a modified polyvinyl alcohol (A) is directly pulverized and microparticulated by a centrifugal mill, a hammer mill or the like and then classifying particles by means of sieving, cyclone classification or the like to obtain particles having an average particle size within the range of the present invention; and pulverizing and microparticulating a polyvinyl alcohol by the above means followed by classifying the particles having an average particle size within the range of the present invention by sieving, cyclone classification or the like and then reacting the polyvinyl alcohol particles with a modifying agent under the conditions where a polyvinyl alcohol is not dissolved, to give a modified polyvinyl alcohol (A).

As long as the effects of the present invention are not inhibited, an additive can be optionally added to particles of the present invention, including a polymerization inhibitor (for example, phenothiazine), a filler, a processing stabilizer such as a copper compound, a weather-resistance stabilizer, a colorant, an ultraviolet absorber, a light stabilizer, an antioxidant, an antistatic agent, a flame retardant, a plasticizer, another thermoplastic resin, a lubricant, a flavor, a defoaming agent, a deodorant, an extender, a release agent, a mold release, a reinforcing agent, an antifungal agent, an antiseptic and a crystallization retarding agent.

Particles of the present invention alone or as a mixture with other components can be used for various applications of a polyvinyl alcohol, in accordance with a known method such as molding, spinning and emulsification. Examples of such applications include a photosensitive printing plate material, a dispersant for a photosensitive emulsion, a printing plate original plate, a surfactant for various applications; a paper modifier such as a paper coating agent, an internal additive and a pigment binder; an adhesive for a wood, a paper, an aluminum foil and an inorganic material; a binder for nonwoven fabric; a paint; a warp sizing agent; a fiber finishing agent; a sizing agent for hydrophobic fiber such as polyester; various other films; a sheet; a bottle; a fiber; a thicker; an aggregating agent; a soil modifier; and hydrogel.

EXAMPLES

There will be detailed the present invention with reference to Examples, but the present invention is not limited to these examples at all. Unless otherwise indicated, "%" and "part(s)" in Examples and Comparative Examples denote "% by mass" and "part(s) by mass", respectively.

[Calculation of Contents of Structural Units Represented by Formula (1) and of Vinyl Alcohol Units]

Using a nuclear magnetic resonance spectrometer "LAMBDA 500" from JEOL Ltd., $^1$H-NMR analysis of particles obtained in Examples and Comparative Examples was conducted in deuterated dimethyl sulfoxide at room temperature. A content of structural units represented by Formula (1) was calculated from an integrated value of a peak derived from an olefin proton (5.0 to 7.5 ppm), and a content of vinyl alcohol units was calculated from a peak derived from a main-chain methine proton (3.1 to 4.0 ppm) in a vinyl alcohol structure.

[Calculation of a Block Character ($\eta'$)]

Using a nuclear magnetic resonance spectrometer "LAMBDA 500" from JEOL Ltd., $^{13}$C-NMR analysis of particles obtained in Examples and Comparative Examples was conducted in deuterium oxide at 70° C., and $\eta'$ was calculated from an integrated value of a peak derived from a main-chain methylene ((OH,OH): 44.5 to 47.5 ppm, (OH,OAc): 42.5 to 44.5 ppm, (OAc,OAc): 39.0 to 42.0 ppm) in accordance with a method described in "Poval" (Kobunshi-Kankokai, revised edition, Apr. 1, 1981, pp. 246 to 249).

[Measurement of an Average Particle Size]

Particles obtained in Examples and Comparative Examples are dispersed in methanol and a volume average particle size was measured using a laser diffraction analyzer "LA-950V2" from Horiba, Ltd.

[Measurement of a Specific Surface Area]

Using a specific surface area measuring instrument "MONOSORB" from Yuasa Ionics Co., Ltd., a specific surface area of particles obtained in Examples and Comparative Examples was determined by a BET one-point method employing nitrogen adsorption.

[Evaluation of Solubility]

Particles obtained in Examples and Comparative Examples were added to a deionized water heated to 80° C. (concentration: 10% by mass), and the dispersion was stirred keeping a temperature at 80° C. and a time for complete dissolution was recorded. When insolubles remained after 24 hours, they are judged to be "unsoluble", which is indicated by "-" in Table 1.

[Evaluation of Photosensitivity]

To an aqueous solution of the particles obtained in Examples and Comparative Examples described below (concentration: 5% by mass) was added 2-hydroxy-4'-(2-hydroxyethoxy)-2-methylpropiophenone as a photoinitiator in 1 part by mass based on 100 parts by mass of the particles, to prepare a coating liquid. The coating liquid was cast into a 15 cm×15 cm mold formed by folding the edges of a polyethylene terephthalate film, and the solvent was fully evaporated at room temperature under an atmospheric pressure, to give a film with a thickness of about 100 μm. The film was irradiated with ultraviolet rays at a strength of 2640 mJ/cm$^2$, to give an evaluation film. The evaluation film thus obtained was immersed in a boiling water for 1 hour, and then removed from the water. After vacuum drying at 40° C. for 12 hours, a mass (W3) was measured. From the mass obtained (W3) and a mass before immersion (W4), an elution rate under the boiling conditions was calculated in accordance with the following equation, and the elution rate was used as an indicator of photosensitivity (the lower an elution rate is, the higher photosensitivity is). When an evaluation film was dissolved in water during immersion, it was evaluated as "unmeasurable", which is shown as "-" in Table 1.

Elution rate (% by mass)=100×([W4]−[W3])/[W4]

[Evaluation of Affinity for a Photosensitive Monomer]

As a photosensitive monomer, 2-hydroxyethyl methacrylate (HEMA) and 4-acryloylmorpholine (ACMO) were mixed with water in a mass ratio shown in Table 1, to prepare an aqueous solution. To the solution was added particles obtained in Examples and Comparative Examples as described below to a concentration of 2% by mass, and the mixture was heated with stirring at 80° C. for 2 hours. Then, stirring was stopped and the mixture was filtered through a PTFE filter with a pore size of 0.45 μm (filter mass: Wa). A mass of the filter with the components collected by filtration (Wb) was measured, and then the filter with the components collected by filtration was dried in vacuo at 80° C. overnight. A mass after drying was measured (Wc). From the equation: (Swelling degree)=(Wb−Wa)/(Wc−Wa), a swelling degree of the components collected by filtration was calculated. According to the criteria below, affinity for a photosensitive monomer was evaluated ("A" means the highest affinity and "C" means the lowest affinity).

No components collected by filtration were obtained: A

A swelling degree of the components collected by filtration was more than 3: B

A swelling degree of the components collected by filtration was 3 or less: C

Example 1

Into a reactor equipped with a stirrer, a reflux condenser, and an inlet port were charged 315 parts by mass of dimethylsulfoxide, 585 parts by mass of methyl methacrylate, 1.1 parts by mass of phenothiazine, and 1.5 parts by mass of sodium acetate, and with stirring at room temperature, 100 parts by mass of a commercially available polyvinyl alcohol resin (Kuraray Co., Ltd., PVA 5-88) was added. The mixture was heated with stirring to 100° C. and reacted as a slurry for 1.5 hours. Then, the mixture was cooled to room temperature. The content was filtrated to collect a modified polyvinyl alcohol, which was then washed with methanol and then dried at 40° C. and 1.3 Pa for 20 hours, to give target particles. The evaluation results are shown in Table 1.

Example 2

Into a reactor equipped with a stirrer, a reflux condenser, and an inlet port were charged 113 parts by mass of dimethylsulfoxide, 454 parts by mass of methyl methacrylate, 1.1 parts by mass of phenothiazine, and 1.1 parts by mass of sodium acetate, and with stirring at room temperature, 100 parts by mass of a commercially available polyvinyl alcohol resin (Kuraray Co., Ltd., PVA 5-74) was added. The mixture was heated with stirring to 100° C. and reacted as a slurry for 8 hours. Then, the mixture was cooled to room temperature. The content was filtrated to collect a modified polyvinyl alcohol, which was then washed with methanol and then dried at 40° C. and 1.3 Pa for 20 hours, to give target particles. The evaluation results are shown in Table 1.

Example 3

Into a reactor equipped with a stirrer, a reflux condenser, and an inlet port were charged 315 parts by mass of dimethylsulfoxide, 585 parts by mass of methyl methacrylate, 1.1 parts by mass of phenothiazine, and 1.5 parts by mass of sodium acetate, and with stirring at room temperature, 100 parts by mass of a commercially available polyvinyl alcohol resin (Kuraray Co., Ltd., PVA 22-88) was added. The mixture was heated with stirring to 100° C. and reacted as a slurry for 3 hours. Then, the mixture was cooled to room temperature. The content was filtrated to collect a modified polyvinyl alcohol, which was then washed with methanol and then dried at 40° C. and 1.3 Pa for 20 hours, to give target particles. The evaluation results are shown in Table 1.

Example 4

Into a reactor equipped with a stirrer, a reflux condenser, and an inlet port were charged 113 parts by mass of dimethylsulfoxide, 454 parts by mass of methyl methacrylate, 1.1 parts by mass of phenothiazine, and 1.1 parts by mass of sodium acetate, and with stirring at room temperature, 100 parts by mass of a commercially available polyvinyl alcohol resin (Kuraray Co., Ltd., PVA 5-74) was added. The mixture was heated with stirring to 100° C. and reacted as a slurry for 2 hours. Then, the mixture was cooled to room temperature. The content was filtrated to collect a modified polyvinyl alcohol, which was then washed with methanol and then dried at 40° C. and 1.3 Pa for 20 hours, to give target particles. The evaluation results are shown in Table 1.

Example 5

Into a reactor equipped with a stirrer, a reflux condenser, and an inlet port were charged 180 parts by mass of dimethylsulfoxide, 720 parts by mass of methyl acrylate, 1.1 parts by mass of phenothiazine, and 1.1 parts by mass of sodium acetate, and with stirring at room temperature, 100 parts by mass of a commercially available polyvinyl alcohol resin (Kuraray Co., Ltd., PVA 5-74) was added. The mixture was heated with stirring to 80° C. and reacted as a slurry for 1 hour. Then, the mixture was cooled to room temperature. The content was filtrated to collect a modified polyvinyl alcohol, which was then washed with methanol and then dried at 40° C. and 1.3 Pa for 20 hours, to give target particles. The evaluation results are shown in Table 1.

Example 6

Into a reactor equipped with a stirrer, a reflux condenser, and an inlet port were charged 900 parts by mass of dimethylsulfoxide, and with stirring at room temperature, 100 parts by mass of a commercially available polyvinyl alcohol resin (Kuraray Co., Ltd., PVA 22-88) was added. The mixture was heated with stirring to 100° C. to give a homogenous solution. The solution was cooled to room temperature, and then to the solution were added 35.9 parts by mass of methyl methacrylate, 1.1 parts by mass of phenothiazine, and 2.0 parts by mass of sodium acetate. After stirring to give a homogenous solution, the solution was again heated to 100° C. After reacting for 6 hours, the solution was cooled to room temperature. The reaction solution was diluted with 600 parts by mass of dimethylsulfoxide. This solution was added dropwise into methanol to precipitate a modified polyvinyl alcohol. The precipitated modified polyvinyl alcohol was collected by filtration, washed with methanol and dried at 40° C. and 1.3 Pa for 20 hours. Next, the modified polyvinyl alcohol obtained was pulverized by an ultracentrifugal pulverizer and classified using a sieve (425 μm to 710 μm) to give target particles. The evaluation results are shown in Table 1.

Comparative Example 1

A commercially available polyvinyl alcohol resin (Kuraray Co., Ltd., PVA 22-98s) was evaluated. A specific surface area of the particles was 0.29 m$^2$/g. The evaluation results are shown in Table 1.

Comparative Example 2

A commercially available polyvinyl alcohol resin (Kuraray Co., Ltd., PVA 22-98) was pulverized by an ultracentrifugal pulverizer and classified using a sieve (425 μm to 700 μm) to give target particles. A specific surface area of the particles was 0.09 m$^2$/g. The evaluation results are shown in Table 1.

Comparative Example 3

Into a reactor equipped with a stirrer, a reflux condenser, and an inlet port were charged 900 parts by mass of dimethylsulfoxide, and with stirring at room temperature, 100 parts by mass of a commercially available polyvinyl alcohol resin (Kuraray Co., Ltd., PVA 22-88) was added. The mixture was heated with stirring to 100° C. to give a homogenous solution. The solution was cooled to room temperature, and then to the solution were added 35.9 parts by mass of methyl methacrylate, 1.1 parts by mass of phenothiazine, and 1.5 parts by mass of sodium acetate. After stirring to give a homogenous solution, the solution was again heated to 100° C. After reacting for 4 hours, the solution was cooled to room temperature. The reaction solution was diluted with 600 parts by mass of dimethylsulfoxide. This solution was added dropwise into methanol to precipitate a modified polyvinyl alcohol. The precipitated modified polyvinyl alcohol was collected by filtration, washed with methanol and dried at 40° C. and 1.3 Pa for 20 hours. Next, the modified polyvinyl alcohol obtained was pulverized by an ultracentrifugal pulverizer and classified using a sieve (75 μm to 212 μm) to give target particles. The evaluation results are shown in Table 1.

Comparative Example 4

Into a reactor equipped with a stirrer, a reflux condenser, and an inlet port were charged 400 parts by mass of dimethylsulfoxide, and with stirring at room temperature, 100 parts by mass of a commercially available polyvinyl alcohol resin (Kuraray Co., Ltd., PVA 22-88) was added. The mixture was heated with stirring to 100° C. to give a homogenous solution. The solution was cooled to room temperature, and then to the solution were added 15 parts by mass of methyl methacrylate, 1.1 parts by mass of phenothiazine, and 1.0 part by mass of sodium methoxide. After stirring to give a homogenous solution, the solution was again heated to 100° C. After reacting for 5 hours, the solution was cooled to room temperature. The reaction solution was diluted with 600 parts by mass of dimethylsulfoxide. This solution was added dropwise into methanol to precipitate a modified polyvinyl alcohol. The precipitated modified polyvinyl alcohol was collected by filtration, washed with methanol and dried at 40° C. and 1.3 Pa for 20 hours. Next, the modified polyvinyl alcohol obtained was pulverized by an ultracentrifugal pulverizer and classified using a sieve (500 μm to 1000 μm) to give target particles. The evaluation results are shown in Table 1.

Comparative Example 5

Into a reactor equipped with a stirrer, a reflux condenser, and an inlet port were charged 400 parts by mass of dimethylsulfoxide, and with stirring at room temperature, 100 parts by mass of a commercially available polyvinyl alcohol resin (Kuraray Co., Ltd., PVA 22-88) was added. The mixture was heated with stirring to 100° C. to give a homogenous solution. The solution was cooled to room temperature, and then to the solution were added 38 parts by mass of methyl acrylate, 1.1 parts by mass of phenothiazine, and 1.8 parts by mass of sodium acetate. After stirring to give a homogenous solution, the solution was again heated to 100° C. After reacting for 5.5 hours, the solution was cooled to room temperature. The reaction solution was diluted with 600 parts by mass of dimethylsulfoxide. This solution was added dropwise into methanol to precipitate a modified polyvinyl alcohol. The precipitated modified polyvinyl alcohol was collected by filtration, washed with methanol and dried at 40° C. and 1.3 Pa for 20 hours. Next, the modified polyvinyl alcohol obtained was pulverized by an ultracentrifugal pulverizer and microparticles were removed using a sieve (300 μm) to give target particles. The evaluation results are shown in Table 1. Preparation of a 5% by mass aqueous solution was attempted, but even the particles were heated at 80° C. for 20 hours or more for dissolution, they were not completely dissolved and the particles absorb water to give a swollen gelatinous material. Thus, a film could not be formed.

Comparative Example 6

Into a reactor equipped with a stirrer, a reflux condenser, and an inlet port were charged 284 parts by mass of dimethylsulfoxide, 284 parts by mass of methyl methacrylate, 1.1 parts by mass of phenothiazine and 1.8 parts by mass of sodium acetate, and with stirring at room temperature, 100 parts by mass of a commercially available polyvinyl alcohol resin (Kuraray Co., Ltd., Elvanol 71-30) was added. The mixture was heated with stirring to 100° C. and reacted as a slurry for 4 hours. Then, the mixture was cooled to room temperature and the content was filtrated to collect a modified polyvinyl alcohol, which was then washed with methanol and then dried at 40° C. and 1.3 Pa for 20 hours to give target particles. The evaluation results are shown in Table 1.

TABLE 1

| | Modified polyvinyl alcohol (A) | | | | | | | Evaluation of solubility Complete dissolution time [hr] | Evaluation of photo-sensitivity Elution rate [%] | Evaluation of affinity for a photosensitive monomer | | | | | |
|---|---|---|---|---|---|---|---|---|---|---|---|---|---|---|---|
| | Polymerization degree of a polyvinyl alcohol resin | Reaction substrate | Modification amount [mol %] | Content of vinyl alcohol units [mol %] | Average particle size [μm] | Specific surface area [m²/g] | η' | | | Water/HEMA [wt/wt] | | | Water/ACMO [wt/wt] | | |
| | | | | | | | | | | 1/9 | 2/8 | 3/7 | 1/9 | 2/8 | 3/7 |
| Example 1 | 500 | Methyl methacrylate | 1.0 | 87.0 | 545 | 0.09 | 0.503 | 3 | 12.0 | B | B | A | A | A | A |
| Example 2 | 500 | Methyl methacrylate | 0.8 | 73.2 | 601 | 0.10 | 0.493 | 4 | 14.1 | B | A | A | A | A | A |
| Example 3 | 1700 | Methyl methacrylate | 2.1 | 86.0 | 595 | 0.10 | 0.533 | 3 | 6.4 | B | B | A | A | A | A |
| Example 4 | 500 | Methyl methacrylate | 0.2 | 73.8 | 495 | 0.12 | 0.490 | 4 | 45.0 | B | A | A | A | A | A |
| Example 5 | 500 | Methyl acrylate | 0.2 | 73.8 | 704 | 0.08 | 0.489 | 4 | 29.3 | B | A | A | A | A | A |
| Example 6 | 1700 | Methyl methacrylate | 2.5 | 85.5 | 620 | 0.09 | 0.667 | 8 | 5.9 | B | B | A | A | A | A |
| Comparative Example 1 | 1700 | — | 0.0 | 98.5 | 121 | 0.29 | 0.465 | 3 | 100.0 | C | C | B | C | B | B |
| Comparative Example 2 | 1700 | — | 0.0 | 98.5 | 550 | 0.09 | 0.465 | 4 | 100.0 | C | C | B | C | B | B |
| Comparative Example 3 | 1700 | Methyl methacrylate | 2.1 | 86.0 | 112 | 0.28 | 0.680 | — | 5.9 | B | B | A | A | A | A |
| Comparative Example 4 | 1700 | Methyl methacrylate | 1.8 | 91.0 | 780 | 0.08 | 0.908 | — | 10.5 | C | C | C | C | C | C |
| Comparative Example 5 | 500 | Methyl acrylate | 2.2 | 97.7 | 1980 | 0.03 | 0.643 | — | — | C | C | C | C | C | C |
| Comparative Example 6 | 1700 | Methyl methacrylate | 5.3 | 94.1 | 109 | 1.39 | 0.601 | — | 1.6 | C | C | B | C | B | B |

As seen from Examples 1 to 6, particles of the present invention are resistant to thermal gelation during preparing an aqueous solution and have excellent water solubility while being excellent in photosensitivity. They have high affinity for a photosensitive monomer and can be thus soluble in a high-concentration aqueous solution of the photosensitive monomer. The particles of the present invention can be, therefore, used for a variety of applications such as an ultraviolet curable and a printing material.

As seen from Comparative Examples 1 and 2, unmodified polyvinyl alcohol particles have high water solubility but are not photosensitive. As seen from Comparative Examples 3, 5, 6, particles having an average particle size beyond the range of the present invention easily gelate during preparing an aqueous solution. Although the cause of this phenomenon is not clear, the inventors have observed that when an average particle size is smaller than the range of the present invention as in Comparative Examples 3 and 6, addition of polyvinyl alcohol resin particles to hot water caused formation of lumps and then, as heating with stirring was continued, the lumps became hydrogel as the aggregates. It is supposed that even after forming lumps, unmodified polyvinyl alcohol particles were eventually completely dissolved by continuous heating with stirring, while a modified polyvinyl alcohol contained in the particles of the present invention was easily crosslinked by heating due to a reaction between modified moieties, so that prolonged heating for dissolving the lumps induced gelation. Meanwhile, when an average particle size is more than the range of the present invention as in Comparative Example 5, it is supposed that in the first place, the particles are less soluble in water and thus as described above, prolonged heating induced gelation. Furthermore, when an average particle size is within the range of the present invention and a content of the vinyl alcohol units is more than the range of the present invention as in Comparative Example 4, the particles have lower affinity for a photosensitive monomer, and cannot be easily dissolved in an aqueous solution of a photosensitive monomer.

The invention claimed is:

1. Particles, comprising:
  a modified polyvinyl alcohol comprising a vinyl alcohol unit of formula (0) and a structural unit of formula (1):

(0)

(1)

wherein, in formula (1), R¹ is H or a methyl group,
wherein the vinyl alcohol unit of formula (0) is present in a range of from 60 to 90 mol.%, based on total modified polyvinyl alcohol repeat units
wherein the structural unit of formula (1) present in the modified polyvinyl alcohol (A) in a range of from 0.05 to 3.0 mol %, based on the total modified polyvinyl alcohol repeat units, wherein the modified polyvinyl alcohol (A) is at least 70 mass % of the particles, based on total particle mass, and wherein the particles have an average particle size of from 300 to 1000 µm.

2. The particles of claim 1, having a specific surface area in a range of from 0.01 to 0.5 m²/g.

3. The particles of claim 1, wherein a block character of residual vinyl ester groups in the modified polyvinyl alcohol is in a range of from 0.35 to 0.60.

4. The particles of claim 1, wherein the structural unit of formula (1) present in the modified polyvinyl alcohol in a range of from 0.07 to 2.5, based on the total modified polyvinyl alcohol repeat units.

5. The particles of claim 1, wherein the structural unit of formula (1) present in the modified polyvinyl alcohol (A) in a range of from 0.1 to 2.5, based on the total modified polyvinyl alcohol repeat units.

6. The particles of claim 1, wherein the vinyl alcohol unit of formula (0) is present in a range of from 65 to 88 mol. % in the modified polyvinyl alcohol (A).

7. The particles of claim 1, wherein the vinyl alcohol unit of formula (0) is present in a range of from 68 to 86 mol. % in the modified polyvinyl alcohol (A).

8. The particles of claim 1, wherein the vinyl alcohol unit of formula (0) is present in a range of from 72 to 86 mol. % in the modified polyvinyl alcohol (A).

9. The particles of claim 1, wherein, in formula (1), $R^1$ is H.

10. The particles of claim 1, wherein, in formula (1), $R^1$ is a methyl group.

11. The particles of claim 1, wherein the modified polyvinyl alcohol (A) is at least 90 mass % of the particles, based on total particle mass.

12. The particles of claim 1, wherein the modified polyvinyl alcohol (A) is at least 95 mass % of the particles, based on total particle mass.

13. The particles of claim 1, wherein the modified polyvinyl alcohol (A) is at least 100 mass % of the particles, based on total particle mass.

14. The particles of claim 1, having an average particle size in a range of from 400 to 900 µm.

15. The particles of claim 1, having an average particle size in a range of from 500 to 800 µm.

16. The particles of claim 1, wherein the modified polyvinyl alcohol (A) comprises no further structural units than the vinyl alcohol unit of formula (0), the structural unit of formula (1), and other vinyl ester unit(s).

17. The particles of claim 1, wherein the modified polyvinyl alcohol (A) further comprises a different vinyl ester unit from the unit of formula (1).

18. The particles of claim 1, wherein the modified polyvinyl alcohol (A) comprises no further structural units than the vinyl alcohol unit of formula (0) and the structural unit of formula (1).

19. The particles of claim 1, wherein the modified polyvinyl alcohol (A) has viscosity-average polymerization degree in a range of from 100 to 3,000.

20. The particles of claim 1, wherein the modified polyvinyl alcohol (A) comprises the vinyl alcohol unit of formula (0) and the structural unit of formula (1) in a main chain.

* * * * *